United States Patent
Kano et al.

(10) Patent No.: US 6,876,893 B2
(45) Date of Patent: Apr. 5, 2005

(54) ORDER-RECEIVING/MANUFACTURING SYSTEM FOR OSCILLATORS, CONTROL METHOD THEREFOR, BUSINESS CENTER SERVER, AND CONTROL-DATA WRITING APPARATUS

(75) Inventors: Toshihiko Kano, Minowa-machi (JP); Kenya Kodaira, Tachikawa (JP); Yoshio Morita, Nagano-ken (JP); Hideaki Kato, Nagano-ken (JP)

(73) Assignee: Seiko Epson Corporation (JP)

( * ) Notice: Subject to any disclaimer, the term of this patent is extended or adjusted under 35 U.S.C. 154(b) by 234 days.

(21) Appl. No.: 09/974,773

(22) Filed: Oct. 9, 2001

(65) Prior Publication Data

US 2002/0059009 A1 May 16, 2002

(30) Foreign Application Priority Data

Oct. 10, 2000 (JP) ........................................ 2000-309643

(51) Int. Cl.[7] .............................................. G06F 19/00
(52) U.S. Cl. .................... 700/100; 700/29; 700/117; 705/26; 331/18
(58) Field of Search ................................ 700/100–108, 700/115–117, 95–96, 34–35, 99; 705/14, 26, 6–10; 331/18, 156, 169, 66

(56) References Cited

U.S. PATENT DOCUMENTS

| | | | |
|---|---|---|---|
| 5,451,912 A | * | 9/1995 | Torode .................... 331/108 C |
| 5,952,890 A | * | 9/1999 | Fallisgaard et al. ........... 331/18 |
| 5,960,405 A | * | 9/1999 | Trefethan et al. ............... 705/9 |
| 6,009,406 A | * | 12/1999 | Nick ........................... 705/10 |

FOREIGN PATENT DOCUMENTS

| | | |
|---|---|---|
| JP | 09-106417 | 4/1997 |
| JP | 2000-076320 | 3/2000 |
| KR | 2000-30107 | 6/2000 |
| WO | WO 98/34165 | 2/1998 |

\* cited by examiner

*Primary Examiner*—Kidest Bahta
(74) *Attorney, Agent, or Firm*—Harness, Dickey & Pierce, P.L.C.

(57) ABSTRACT

A blank oscillator 300' is prepared for each office, and control data is written into this blank oscillator 300', thereby manufacturing an oscillator 300. Upon receiving an order from a user terminal 10, a business center server 100 selects the most suitable office for the delivery of the oscillator and sends the data to the office. A data writing apparatus 200 installed in this office generates control data based on the data, and writes the control data into the blank oscillator 300', thereby manufacturing the oscillator 300.

23 Claims, 19 Drawing Sheets

110 : OFFICE MANAGEMENT DATA

| OFFICE | MANAGEMENT AREA |
|---|---|
| SHINJUKU OFFICE | 23 TOKYO DISTRICTS |
| TAMA OFFICE | TAMA AREA |
| OHMIYA OFICE | SAITAMA HIGASHI AREA |
| IRUMA OFFICE | SAITAMA NISIHI AREA |
| ... | ... |

USER REGISTRATION

COMPANY NAME/SECTION

NAME

TELEPHONE NO.

POSTAL CODE

ADDRESS

MAIL ADDRESS

PURPOSE OF USE reset go

FIG. 13

ORDER DATA INPUT

| | |
|---|---|
| PACKAGE | JA: 14x9.8 Plastic Package / JC: 10.5x5 Plastic Package / JF: 7x5 Plastic Package / DB: FULL-SIZE DIP / DC: HALF-SIZE DIP / CA: 7x5 Ceramic Package |
| FUNCTION | Standby Mode |
| FREQUENCY PRECISION | M |
| SET FREQUENCY | ___ MHz |
| POEWR SUPPLY VOLTAGE | ● 5.0V,CMOS  ○ 5.0V,TTL  ○ 3.3V,CMOS |
| PREFERENTIAL CHARACTERISTICS | ● CURRENT CONSUMPTION  ○ Preferential *Jitter* |
| COST | ___ YEN |
| DELIVERY DATE | 2000/ / |

(go)  (reset)

FIG. 14

ORDER DATA INPUT

PACKAGE

FUNCTION • OE Mode ○ Standby Mode

FREQUENCY PRECISION • [A] ○ [B] ○ [C] ○ [M]

SET FREQUENCY [    ] MHz

POWER SUPPLY VOLTAGE • 5.0V,CMOS ○ 5.0V,TTL ○ 3.3V,CMOS

PREFERENTIAL CHARACTERISTICS • CURRENT CONSUMPTION ○ Preferential Jitter

COST [    ] YEN

DELIVERY DATE 2000/ /

CHARACTERS TO BE PRINTED [    ]

(go) (reset)

FIG. 18

ORDER-RECEIVING/MANUFACTURING SYSTEM FOR OSCILLATORS, CONTROL METHOD THEREFOR, BUSINESS CENTER SERVER, AND CONTROL-DATA WRITING APPARATUS

BACKGROUND OF THE INVENTION

1. Technical Field of the Invention

The present invention relates to an order-receiving/manufacturing system for receiving an order for an oscillator having a frequency specified by a user and for manufacturing the oscillator, a control method for this system, a business center server used for this system or method, and a control-data writing apparatus.

2. Description of the Related Art

Hitherto, when ordering an oscillator having the specifications required by a user, the user sends the information indicating the specifications to a business center by, for example, a facsimile.

The business center receives the order for the oscillator and the manufactures it according to the following procedure:

receiving order data, such as a frequency required by the user by, for example, a facsimile;

manufacturing an oscillation source, such as a quartz crystal resonator, corresponding to the frequency specified in the order data;

designing a circuit corresponding to this oscillation source;

manufacturing an oscillator by assembling the oscillation source and the circuit; and delivering the manufactured oscillator to the user.

Then, the user obtains the required oscillator.

However, according to the conventional order-receiving/manufacturing procedure, the oscillation source is designed and manufactured after the user's order is received. It thus takes time from receiving the order to delivering the oscillator.

Accordingly, in view of the above-described problem, it is an object of the present invention to provide an order-receiving/manufacturing system for oscillators in which the period from when an order for an oscillator is received to when the oscillator is manufactured can be shortened, a control method for this system, a business center server used for this system or method, and a control-data writing apparatus.

SUMMARY OF THE INVENTION

In order to solve the above-described problems, according to the invention, there is provided an order-receiving/manufacturing system for receiving an order for an oscillator and manufacturing the oscillator according to a specification required by a user. The order-receiving/manufacturing system includes: a business center server for receiving via a network order data including a desired oscillation frequency and user data including a destination of the oscillator for the user, and for selecting, among control-data writing apparatuses installed in a plurality of places, the control-data writing apparatus installed in the place suitable for receiving the order for the oscillator based on the order data or the user data, and for sending the order data and the user data to the selected control data wiring apparatus; and the control-data writing apparatus for generating control data from the received order data for an oscillator which oscillates in accordance with the control data written into the oscillator, and for writing the control data into the oscillator.

According to the invention, in the order-receiving/manufacturing system, the order data may include marking data indicating characters, graphics, and patterns to be marked on a surface of the oscillator, and the characters, the graphics, or the patterns may be marked on the surface of the oscillator based on the marking data by a marking device disposed adjacent to the control-data writing apparatus.

According to the invention, in the order-receiving/manufacturing system, the marking data may include print data, and the marking device may include a printer.

According to the invention, in the order-receiving/manufacturing system, the marking data may include carving data, and the marking device may include a carving device.

According to the invention, in the order-receiving/manufacturing system, the business center server may inform a delivery date of the oscillator to a user terminal based on delivery information of the selected control-data writing apparatus.

According to the invention, in the order-receiving/manufacturing system, the delivery information may include a distance between the selected control-data writing apparatus and a destination of the oscillator, the number of oscillators prepared for the control-data writing apparatus, or delivery cost.

According to the invention, in the order-receiving/manufacturing system, the business center server may determine based on the order data including the oscillation frequency whether it is possible to manufacture the oscillator which generates the oscillation frequency required by the user.

According to the invention, in the order-receiving/manufacturing system, the business center server may include storage means for storing the number of oscillators into which the control data is to be written, and which are prepared for each of the control-data writing apparatuses, and the business center server may perform stock management for the oscillators.

According to the invention, in the order-receiving/manufacturing system, the business center server may include storage means for sequentially storing and updating the order data and the user data, and may perform customer management.

According to the invention, in the order-receiving/manufacturing system, the order data may include data of the configuration or the material of the oscillator.

According to the invention, in the order-receiving/manufacturing system, the order data may include data of a function of indicating a waveform status when the oscillator is activated to output the oscillation frequency.

According to the invention, in the order-receiving/manufacturing system, the order data may include data of a power supply voltage.

According to the invention, in the order-receiving/manufacturing system, the order data may include data of temperature frequency stability.

According to the invention, in the order-receiving/manufacturing system, the order data may include data of the number of oscillators to be ordered.

According to the invention, there is provided a control method for an order-receiving/manufacturing system for receiving an order for an oscillator and manufacturing the oscillator according to a specification required by a user. The control method includes: a step of receiving via a network order data including a desired oscillation frequency and user data including a destination of the oscillator for the user; a step of selecting, among control-data writing apparatuses installed in a plurality of places, the control-data writing apparatus installed in the placesuitable for receiving the order for the oscillator based on the order data or the user data; a step of sending the order data and the user data to the selected control-data writing apparatus; and a step of generating control data from the received order data for an oscillator which oscillates in accordance with the control data written into the oscillator, and of writing the control data into the oscillator by the control-data writing apparatus.

According to the invention, in the control method for an order-receiving/manufacturing system, the order data may include marking data indicating characters, graphics, and patterns to be marked on a surface of the oscillator. The control method may include the step of marking the characters, the graphics, or the patterns on the surface of the oscillator based on the marking data by using a marking device disposed adjacent to the control-data writing apparatus.

According to the invention, there is provided a business center server for receiving via a network order data including a desired oscillation frequency and user data including a destination of an oscillator. The business center server includes: office-management-data storage means for storing as office management data a management area assigned to each of a plurality of offices provided with a control data writing apparatus for generating control data from the received order data for an oscillator which oscillates in accordance with the control data written into the oscillator, and for writing the control data into the oscillator; office selecting means for selecting an office suitable for receiving an order for the oscillator based on the user data and the office management data from a plurality of offices; and data sending means for sending the order data and the user data to the selected office.

According to the invention, in the business center server, a delivery date of the oscillator may be informed to a user terminal based on delivery information of the selected office.

According to the invention, in the business center server, the delivery information may include a distance between the selected office and a destination of the oscillator, the number of oscillators prepared for the control-data writing apparatus, or delivery cost.

According to the invention, in the business center server, it may be determined based on the order data including the oscillation frequency whether it is possible to manufacture an oscillator which generates the oscillation frequency required by the user.

According to the invention, in the business center server, storage means may be provided for storing the number of oscillators into which the control data is to be written and which are prepared for each of the offices, thereby performing stock management for the oscillators.

According to the invention, in the business center server, storage means may be provided for sequentially storing and updating the order data and the user data, thereby performing customer management.

According to the invention, there is provided a control-data writing apparatus installed in each office and provided with a function of receiving order data, for generating control data at least from the order data for an oscillator which oscillates in accordance with the control data written into the oscillator, and for writing the control data into the oscillator. The control-data writing apparatus is used for an oscillator which includes: variable capacitor means for outputting a reference signal of a reference oscillation frequency obtained by adjusting a resonance frequency of a piezoelectric resonator; frequency control means for acquiring an output signal of an output frequency by dividing and/or multiplying the frequency of the reference signal; and a memory for storing control data of the variable capacitor means and the frequency control means. The control-data writing apparatus includes: an oscillator connecting unit for connecting a terminal of the oscillator; a characteristic-data generator for generating characteristic data including at least a desired oscillation frequency, which is a target frequency of the oscillator, from the received order data; first control data generator for generating first control data for controlling the frequency control means to acquire the target oscillation frequency in relation to the reference oscillation frequency; second control data generator for generating second control data for controlling the variable capacitor means to acquire the reference oscillation frequency in relation to the resonance frequency of the piezoelectric resonator; and a data writing controller for writing the first control data and the second control data into the memory.

BRIEF DESCRIPTION OF THE DRAWINGS

FIG. 4 illustrates office management data stored in a database.

FIG. 12 illustrates a user registration screen.

FIG. 13 illustrates an order-data input screen.

FIG. 14 illustrates the order-data input screen displayed after the screen shown in FIG. 13.

FIG. 18 illustrates the order-data input screen.

DETAILED DESCRIPTION OF THE PREFERRED EMBODIMENTS

Preferred embodiments of the present invention are described below with reference to the drawings.

[1] First Embodiment

[1.1] Schematic Configuration of First Embodiment

Figure 1:
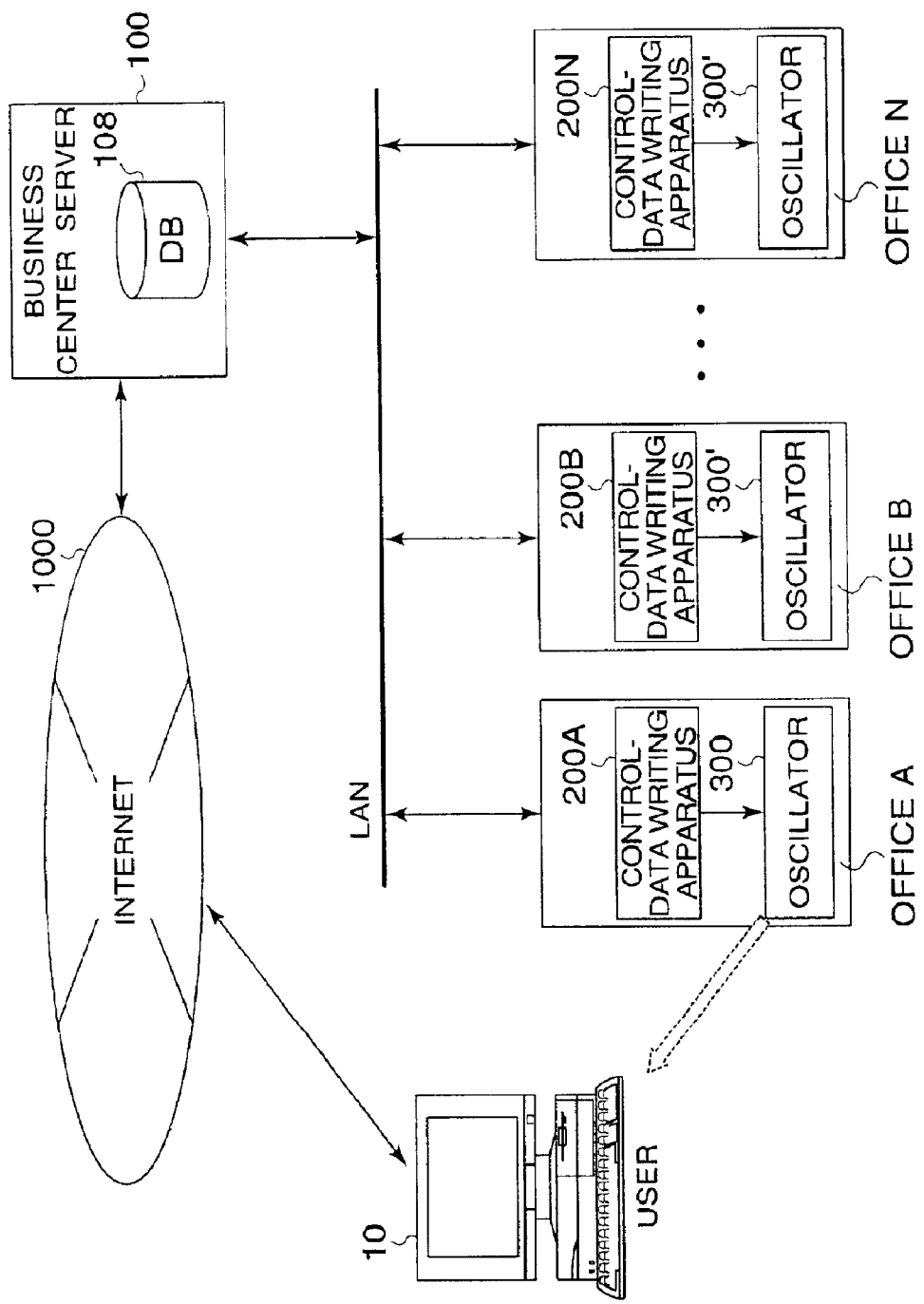
FIG. 1 is a schematic diagram illustrating an order-receiving/manufacturing system for oscillators according to a first embodiment.

FIG. 1 is a schematic diagram illustrating an order-receiving/manufacturing system for oscillators according to a first embodiment.

This order-receiving/manufacturing system is a system for receiving an order for an oscillator and manufacturing the oscillator according to the order sent from a user.

The order-receiving/manufacturing system for oscillators is largely formed of a business center server 100 connected to the Internet 1000 and control-data writing apparatuses 200A, 200B, . . . , 200N (generally, referred to as a control-data writing apparatus 200) connected to this business center server 100 via a LAN (Local Area Network) or a WAN (Wide Area Network). The business center server 100 and the control-data writing apparatus 200 may be connected via the Internet.

A plurality of user terminals 10 (only one is shown) are connected to the Internet 1000, and the user operates this user terminal 10 so as to order an oscillator.

Moreover, the control-data writing apparatuses 200A, 200B, . . . , 200N are installed in offices A, B, . . . , N, respectively, authorized by the business center. More specifically, these offices are the Shinjuku Office, the Tama Office, the Ohmiya Office, and the Iruma Office, as shown in FIG. 4, and a management area is assigned to each office.

For each office, several types of blank oscillators 300' having an integrated device are prepared. When control data is written into the blank oscillators 300', they oscillate according to the control data. The control-data writing apparatus 200 writes the control data corresponding to the desired specifications into this oscillator 300', thereby manufacturing a real oscillator 300.

In this embodiment, for convenience, the oscillator before the control data is written is determined to be the blank oscillator 300' so that it can be distinguished from the oscillator 300 after the control data is written.

[1.2] Configuration of User Terminal 10

Figure 2:
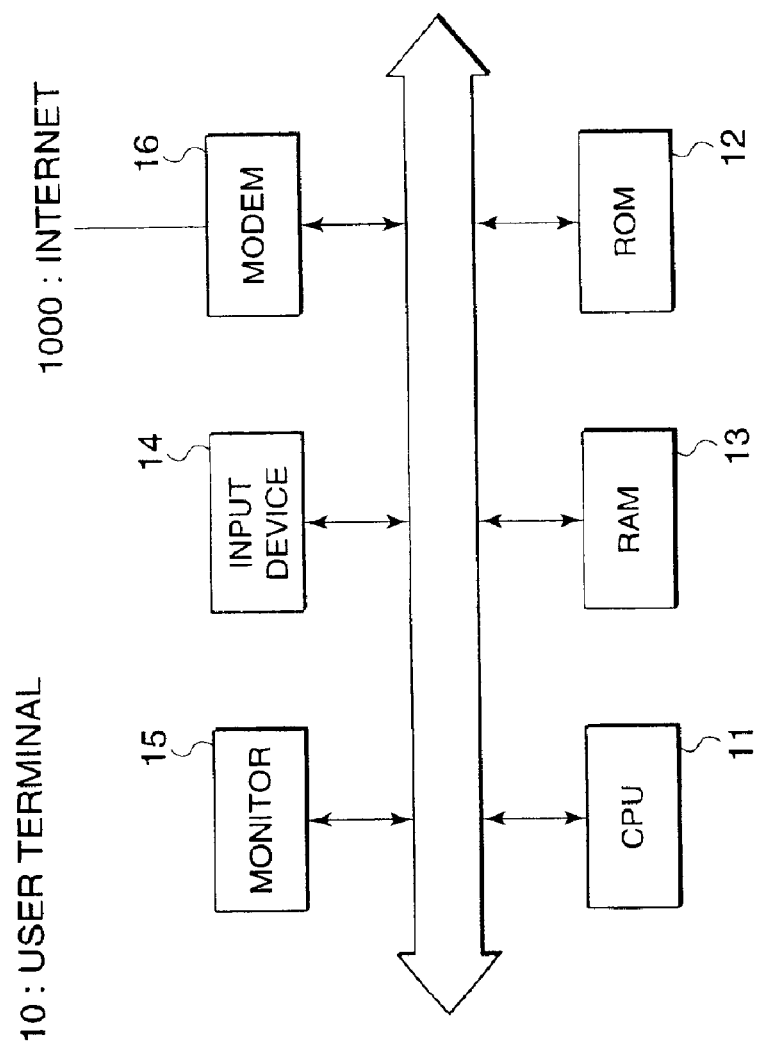
FIG. 2 is a block diagram illustrating a user terminal used in the same embodiment.

The configuration of the user terminal 10 is discussed below with reference to FIG. 2.

This user terminal 10 is a personal computer (hereinafter referred to as a "PC") installed in an office or a home. The user terminal 10 includes a CPU 11, a ROM (Read Only Memory) 12, a RAM (Random Access Memory) 13, an input device 14, such as a keyboard and a mouse, a monitor 15, and a modem 16 connected to the Internet 1000.

In this embodiment, a person who orders an oscillator is referred to as a "user".

The ROM 12 is a read-only program memory, and the CPU 11 executes a control program read from the ROM 12. The RAM 13 is used as a work area for executing various control programs by the CPU 11.

The user then operates the input device 14 of the user terminal 10 so as to refer to a web page of the business center server 100 via the monitor 15, thereby inputting user data and order data. This enables the user to send the above-mentioned data to the business center server 100 via the Internet 1000.

[1.3] Configuration of Business Center Server 100

Figure 3:
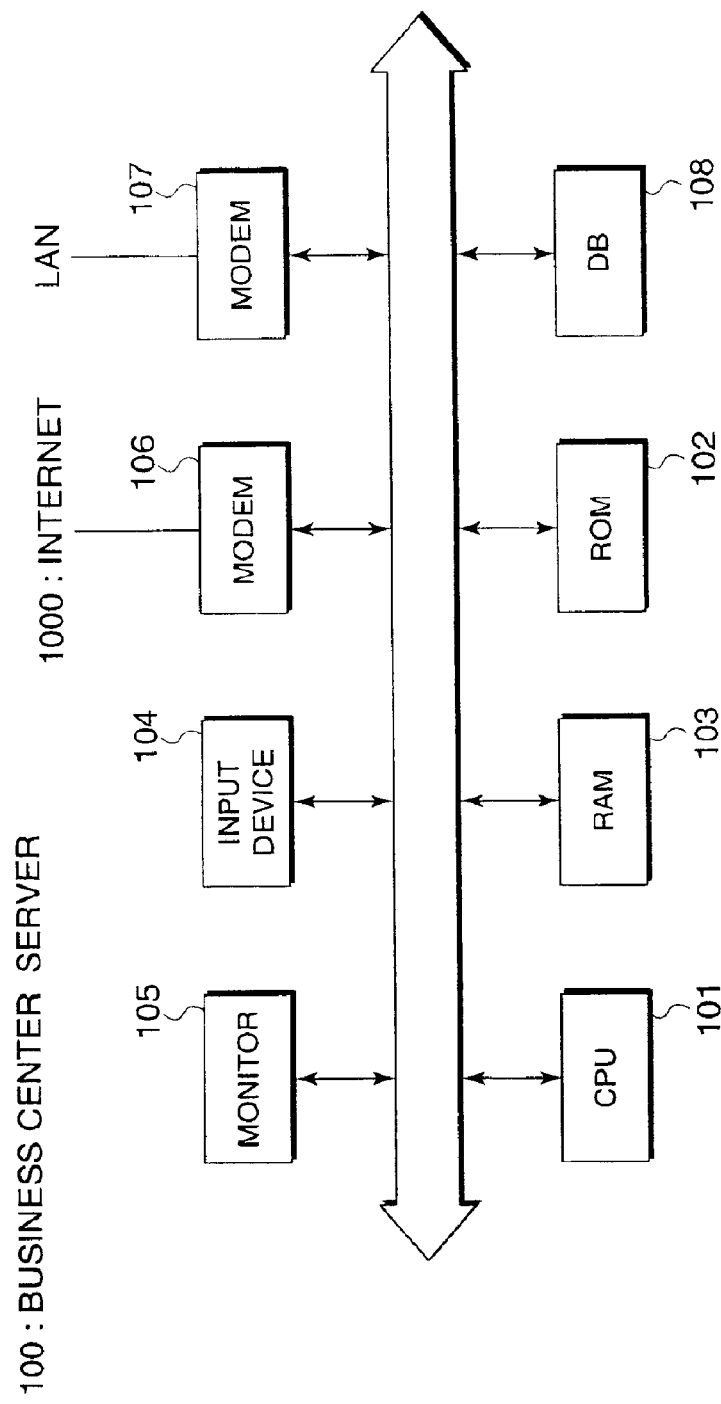
FIG. 3 is a block diagram illustrating a business center server used in the same embodiment.

The configuration of the business center server 100 is described below with reference to FIGS. 3 through 5.

This business center server 100 includes a CPU 101, a ROM 102, a RAM 103, an input device 104, such as a keyboard and a mouse, a monitor 105, a modem 106 connected to the Internet 1000, a modem 107 connected to a LAN, and a database (DB) 108 storing various types of data.

Figure 5:
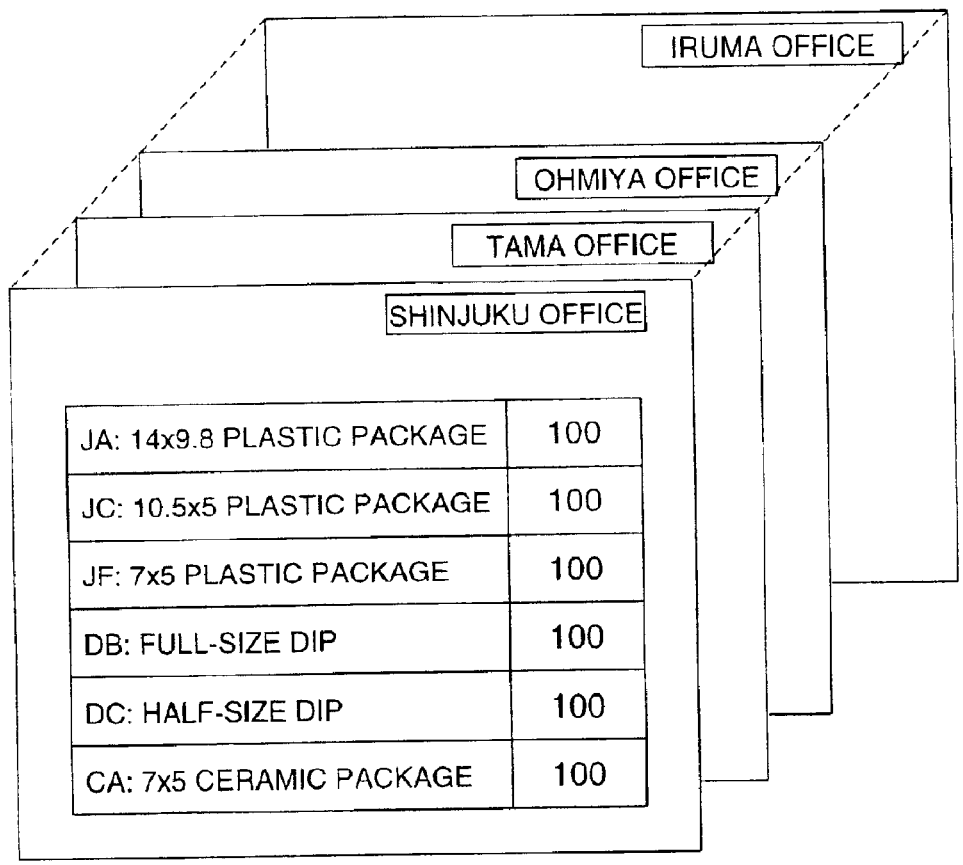
FIG. 5 illustrates stock management data stored in a database.

The DB 108 stores office management data 110 shown in FIG. 4, stock management data 120 of the blank oscillators 300' shown in FIG. 5, customer data, and so on.

The office management data 110 stores management areas assigned to the individual offices. More specifically, the office management data 110 stores data, as shown in FIG. 4, in which the 23 Tokyo districts are assigned to the Sinjuku Office, the Tama area is assigned to the Tama Office, the Saitama Higashi area is allocated to the Ohmiya Office, the Saitama Nishi area is allocated to the Iruma Office, and so on.

The stock management data 120 stores the number of each type of blank oscillator 300' prepared for each office. More specifically, as shown in FIG. 5, the stock management data 120 stores data, such as the number of packages JA, the number of packages JC, the number of packages JF, the number of packages DB, the number of packages DC, and the number of packages CA prepared for each office. Details of the packages are discussed below.

The business center server 100 receives the user data and the order data from the user terminal 10, and then performs user registration, frequency determination processing for determining whether it is possible to manufacture an oscillator which generates a frequency desired by the user, office selection processing for selecting the most suitable office for delivering the oscillator to the user, customer management processing, and stock management processing for managing the number of blank oscillators 300' in the office. The above-described user registration and various operations are discussed later.

[1.4] Configuration of Oscillator 300

Figure 6:
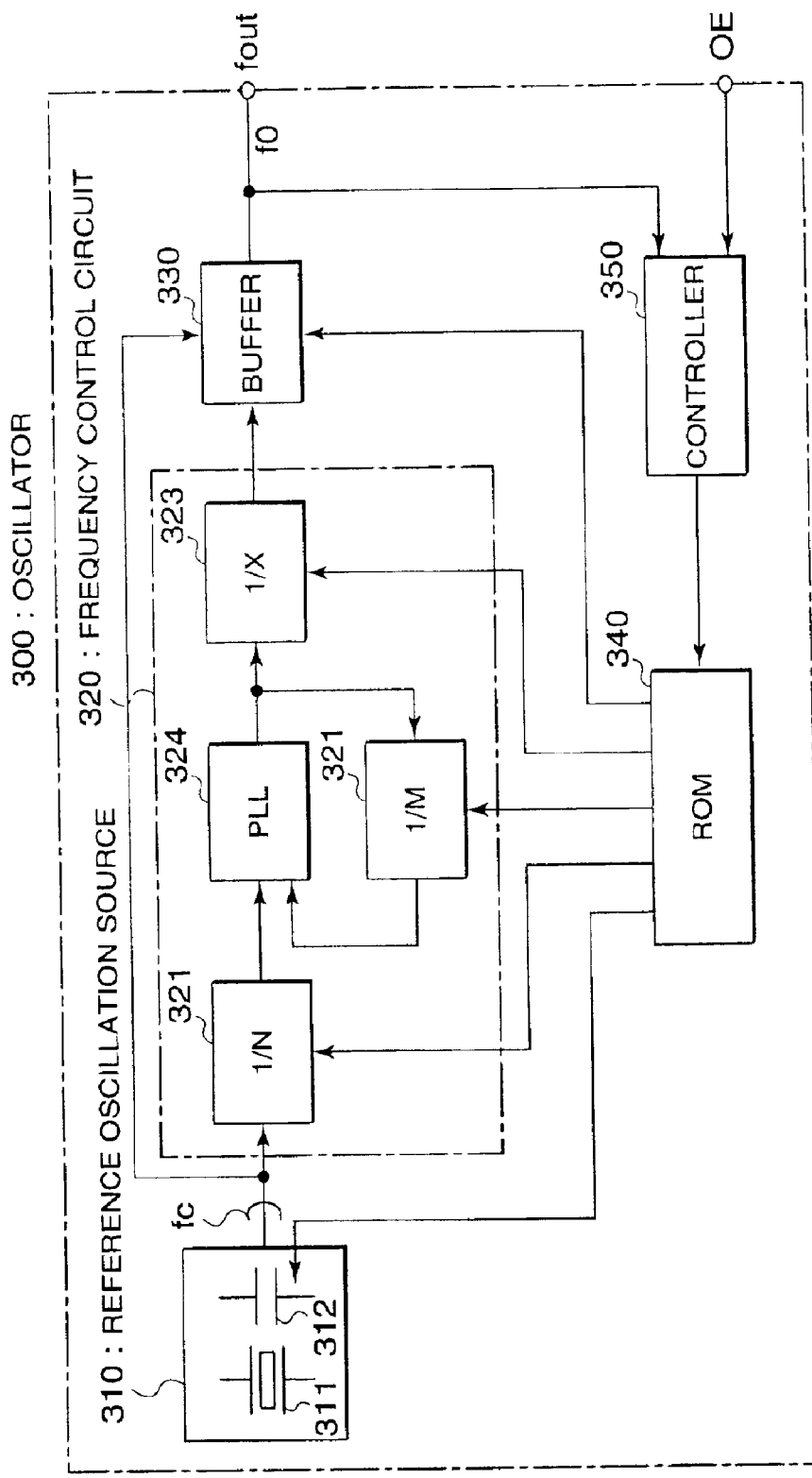
FIG. 6 is a block diagram illustrating the configuration of an oscillator used in the same embodiment.

The configuration of the oscillator 300 is described below with reference to FIG. 6.

The oscillator 300 includes a reference oscillation source 310, a frequency control circuit 320, a buffer 330, a ROM 340, and a controller 350.

The reference oscillation source 310 has a resonator 311, such as a quartz crystal resonator, and a variable capacitor 312, such as a capacitor array or a variable capacitor (varicap) diode for adjusting the resonance frequency of the resonator 311 by changing the composite capacitance of the reference oscillation source 310. The variable capacitor 312 changes the capacitance so as to change the reference oscillation frequency fc of a reference signal generated by the reference oscillation source 310.

The frequency control circuit 320 includes a programmable divider (reference divider: RD) 321, a programmable divider (feedback divider: FD) 322, a PLL circuit 324, and a programmable divider (output divider: OD) 323.

The RD 321 divides the oscillation frequency fc of the oscillation signal output from the reference oscillation source 310 by N. The FD 322 divides the frequency of a signal output from the PLL circuit 324 by M. The PLL circuit 324 multiplies the frequency of a signal output from the RD 321 by M according to the signal divided by M by the FD 322. The OD 323 divides the frequency of a signal output from the PLL circuit 324 by X.

The reference signal of the reference oscillation frequency fc input into the frequency control circuit 320 is output from an output terminal fout via the buffer 330 as an output signal having the adjusted output frequency f0.

The output of the reference oscillation source 310 is also connected to the buffer 330 without passing through the frequency control circuit 320. Accordingly, the reference signal having the unadjusted or adjusted reference oscillation frequency fc is directly supplied to the buffer 330.

The ROM 340 stores the specified value of the variable capacitor 312 (second control data), the specified value of the frequency control circuit 320 (first control data), etc. The controller 350, which controls the writing of the data into the ROM 340, is set to a write mode by an enable signal input into a control terminal OE.

As discussed above, the control data is written into the ROM 340 of the blank oscillator 300' by the control-data writing apparatus 200, thereby converting the blank oscillator 300' into the oscillator 300 for performing the oscillating operation corresponding to the control data.

By and large, the configurations of the oscillators 300 can be divided into an SMD (Surface Mounting Device) type and a DIP (Dual Inline Package) type. In this embodiment, these types include six types, such as package JA, package JC, package JF, package DB, package DC, and package CA.

More specifically, the package JA is an SMD-type plastic package having a size of 14×9.8 [mm], the package JC is an SMD-type plastic package having a size of 10.5×5 [mm], the package JF is an SMD-type plastic package having a size of 7×5 [mm], the package DB is a full-size DIP-type package, the package DC is a half-size DIP-type package, and the package CA is an SMD-type ceramic package having a size of 7×5 [mm].

[1.5] Control-data Writing Apparatus 200

[1.5.1] Configuration of Control-data Writing Apparatus 200

Figure 7:
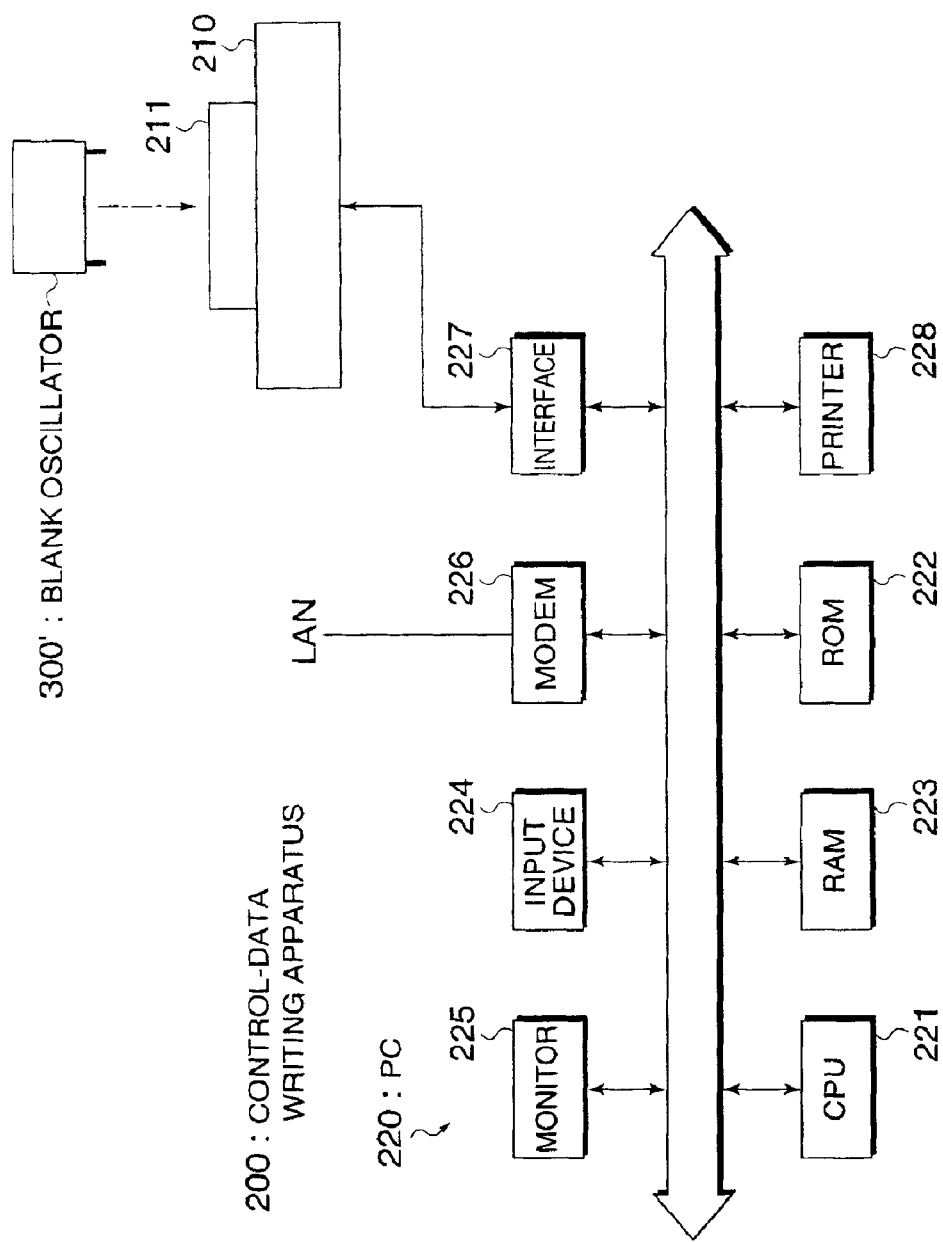
FIG. 7 is a block diagram illustrating a control-data writing apparatus used in the same embodiment.
Figure 8:
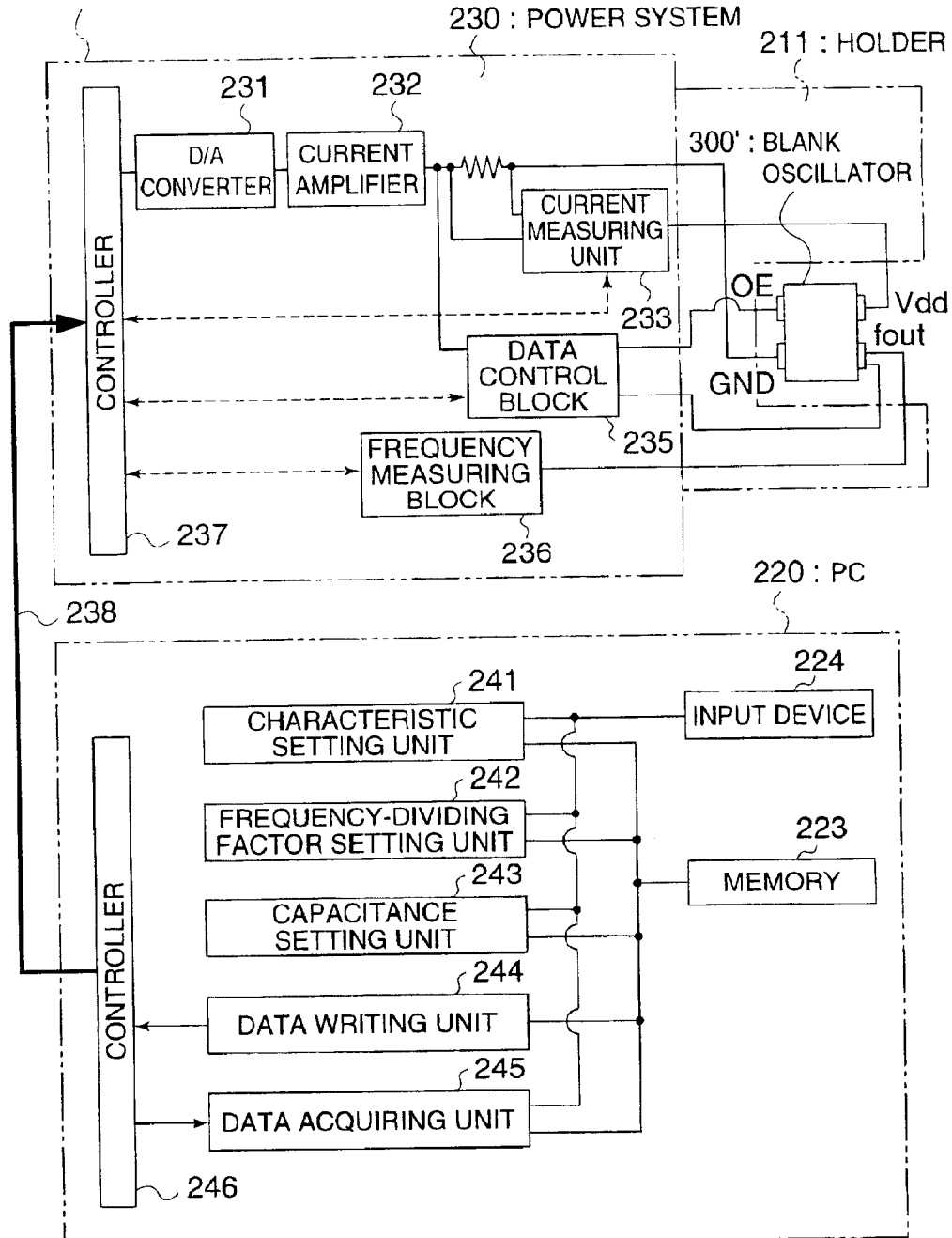
FIG. 8 is a functional block diagram of the same control-data writing apparatus.

A description is now given of the configuration of the control-data writing apparatus 200 according to this embodiment with reference to FIGS. 7 and 8.

The control-data writing apparatus 200 includes a special-purpose oscillator connecting unit 210 provided with a holder 211 to which the blank oscillator 300' is attached, and a personal computer (PC) 220 for running an application program which sets the characteristics of the oscillator 300 from the order data sent from the business center server 100 via a LAN, and which computes the control data to be written into the ROM 340 of the oscillator 300 in accordance with the set characteristics.

An automatic supplier (not shown) for supplying the blank oscillators 300' is installed in the vicinity of the holder 211. In this automatic supplier, six types of blank oscillators 300' are constantly provided in different cassettes, and the blank oscillator 300' of the package corresponding to the package data indicated in the order data is supplied to the holder 211.

The PC 220 includes a CPU 221, a ROM 222, a RAM 223, an input device 224, such as a keyboard and a mouse, a monitor 225, a modem 226 connected to a LAN, an interface 227 connected to the oscillator connecting unit 210, and a printer 228 for printing a delivery sheet or a bill.

An operation program for performing a writing operation of the control data is stored in the ROM 222 of the PC 220. The CPU 221 executes the operation program read from the ROM 222 so as to write the control data into the ROM 340 of the blank oscillator 300' via the oscillator connecting unit 210. The RAM 223 is used as a work area for executing various programs by the CPU 221.

FIG. 8 is a functional block diagram illustrating the control-data writing apparatus 200.

The connecting unit 210 includes a power system 230, a data control block 235, and a frequency measuring block 236, and the power system 230, the data control block 235, and the frequency measuring block 236 are connected to the PC 220 via a controller 237 and a cable 238.

The power system 230 supplies operation power to power terminal Vdd and GND of the oscillator 300, and digitally controls the power to be supplied to the oscillator 300.

The power system 230 has a D/A converter 231, a current amplifier 232, and a current measuring unit 233. The measured result from the current measuring unit 233 is computed in a data acquiring unit 245 of the PC 220, which is discussed later, thereby measuring the power consumption of the oscillator 300. Further, if the data acquiring unit 245 has detected that the power consumption cannot be measured even though a voltage of a predetermined polarity is applied, it can be determined that the connection between the oscillator 300 and the holder 211 is poor. The power system 230 also has a function of controlling the voltage of the control terminal OE of the oscillator 300 so as to control the writing and reading of data into and from the ROM 340 of the oscillator 300.

The data control block 235 reads and writes data from and into the ROM 340 via the control terminal OE and the output terminal fout of the oscillator 300. The data control block 235 also has a monitoring function of monitoring the waveform written into the oscillator 300. With this function, the data control block 235 controls the waveform to fall within a predetermined voltage and time so as to prevent the loss of data of the ROM 340 or the damage to the ROM 340 itself.

The frequency measuring block 236 measures the unadjusted oscillation frequency and the adjusted output frequency via the output terminal fout.

The PC 220 controls the operation of application software provided with various functions, such as a characteristic setting unit 241, a frequency-dividing factor setting unit 242, a capacitance setting unit 243, a data writing unit 244, and a data acquiring unit 245.

The characteristic setting unit 241 sets characteristic information, such as the output frequency which is desirably obtained in the oscillator 300, the precision rank, the model type, and the function (ST, OE, STZ) from the received order data. The frequency-dividing factor setting unit 242 determines the frequency-dividing factors (first control data) to be set in the individual program dividers, such as the RD 321, the FD 322, and the OD 323 of the frequency control circuit 320 of the oscillator 300. The capacitance setting unit 243 sets the capacitance (second control data) of the variable capacitor 312, such as a capacitor array, of the oscillator 300. The data writing unit 244 writes the set data into the ROM 340 of the oscillator 300. The acquiring unit 245 controls the above-described connecting unit 210 via a controller 246 so as to acquire the data, such as ID information, prestored in the ROM 340, thereby obtaining the oscillation frequency and the output frequency.

The content set by the characteristic setting unit 241 and the control data to be written by the data writing unit 244 are stored in the RAM 223 of the PC 220.

[1.5.2] Operation of Control-data Writing Apparatus 200

Figure 9:
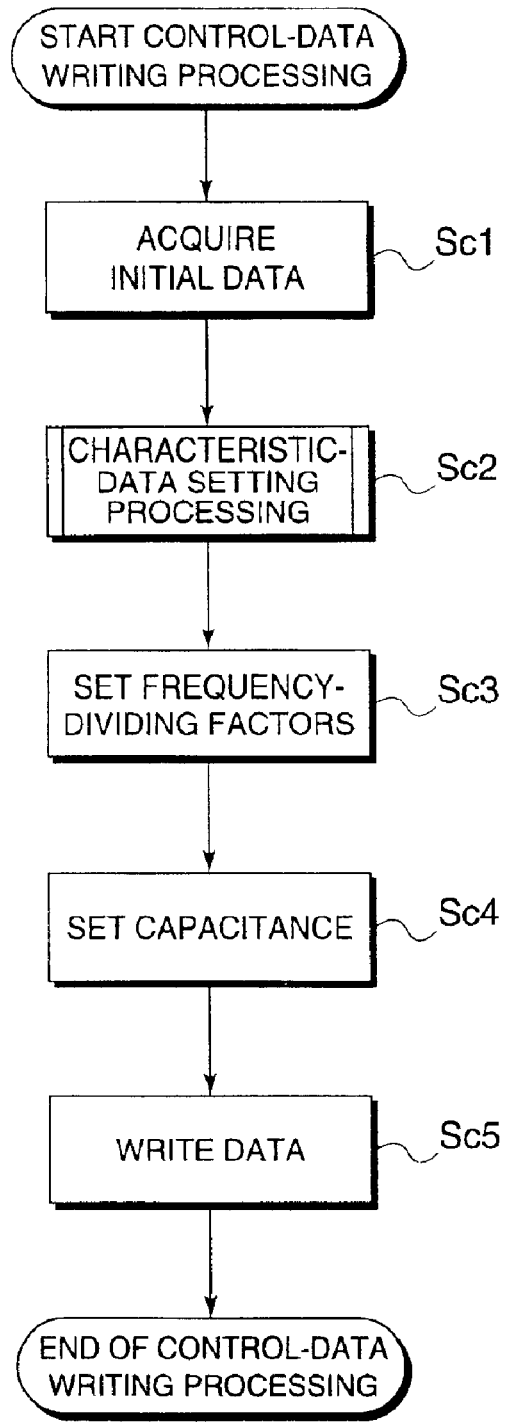
FIG. 9 is a flow chart illustrating the control data writing processing performed by the control-data writing apparatus.
Figure 10:
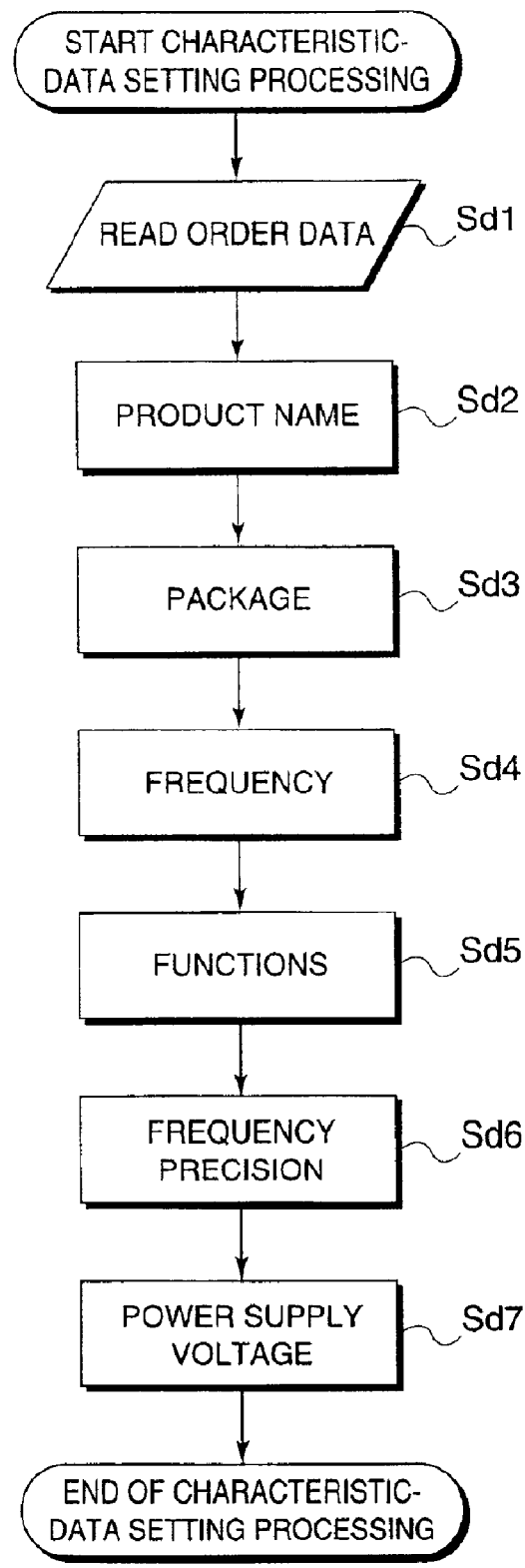
FIG. 10 is a flow chart illustrating the characteristic-data setting processing performed by the control-data writing apparatus.

The operation of the control-data writing apparatus 200 is discussed below with reference to the block diagram of the control-data writing apparatus 200 shown in FIG. 7, the functional block diagram shown in FIG. 8, and the flow charts of FIGS. 9 and 10.

Before starting this processing, an enable signal is supplied to the control terminal OE of the blank oscillator 300' so that the blank oscillator 300' enters the write mode.

The data acquiring unit 245 acquires initial data including the oscillation frequency fc when the variable capacitor 312 of the oscillator 300 is unadjusted, and the initial value Ci of the variable capacitor 312 (step Sc1).

In the initial-data acquiring step Sc1, it is checked whether the oscillator 300 is correctly attached by using the power system 230. Accordingly, along with the function of checking for human error, such as incorrect attachment, at an early stage, a warning can be issued to prohibit a writing operation when the oscillator 300 is set in a cassette in an incorrect orientation. This prevents the oscillator 300 or the control-data writing apparatus 200 from being damaged, thereby making the writing operation easy and efficient.

In the initial-data acquiring step Sc1, it can also be determined whether control data has already been stored in the oscillator, thereby preventing the oscillator from being overwritten.

Then, the data acquiring unit 245 performs processing for setting characteristic data including the output frequency f0, which is a target frequency of the oscillator 300, from the order data (step Sc2).

The characteristic-data setting processing is described below by way of an example shown in FIG. 10.

First, by the process described later the CPU 221 reads the order data which has been written into the RAM 223 of the control-data writing apparatus 200 from the business center server 100 (step Sd1), and sets the product name of the blank oscillator 300' into which the control data is written (step Sd2).

Then, the CPU 221 sets the package from the order data (step Sd3). With this setting, various data required for determining the control data, such as the information of the resonator 311 provided for the blank oscillator 300' can be set in advance. The ID information of the individual oscillators 300, such as the oscillators and the packages, may be written into the ROM 320 of the corresponding oscillator 300 when manufacturing the oscillators 300, and may automatically be read by the application software when acquiring the initial data in step Sc1.

Subsequently, the CPU 221 sets a desired output frequency f0 (step Sd4), and also sets the functions (step Sd5).

The functions include an OE function for increasing the impedance of the output terminal fout to a high level while activating the reference oscillation source 310 and the PLL circuit 324, an ST function for decreasing the level of the output terminal fout by switching off the reference oscillation source 310 and the PLL circuit 324, and an STZ function for increasing the impedance of the output terminal fout to a high level rather than a low level. The oscillator 300 may be set in a synchronous stop mode in which the oscillating operation starts after the oscillation period when receiving an instruction to perform the above-described function, or an asynchronous stop mode in which the oscillating operation starts at the same time as receiving the above instruction.

The CPU 221 also sets the allowance level (precision rank) for the desired output frequency f0 (step Sd6), and sets the power supply voltage (step Sd7). Then, the CPU 221 returns to step Sc3 of FIG. 9.

The characteristic-data setting processing is not restricted to the above-described processing. Alternatively, the characteristic-data setting processing may be performed for setting the output waveform duty to a CMOS or TTL oscillator by changing the voltage and the duty of the oscillator 300. Alternatively, the characteristic-data setting processing may be performed for determining whether priority is given to high precision or low power, or whether a PLL output may be set at a high level or a low level.

Moreover, the number of buffers connected to the output terminal may be set so as to determine whether the oscillator 300 operates with a high driving power or a low power consumption. For example, with a greater number of buffers, the driving power is increased, but the power consumption and radiation noise are also increased.

Referring back to FIG. 9, the frequency-dividing factor setting unit 242 sets the reference oscillation frequency (reference frequency) fr as the base of the oscillation frequency fc or the output frequency f0, and determines the first control data (frequency-dividing factors N, M, and X of the programmable dividers 321, 322, and 323, respectively) for controlling the frequency control circuit 320 to obtain the target output frequency f0 in relation to the reference frequency fr (step Sc3).

The capacitance setting unit 243 determines the second control data (adjusted C value) Co for controlling the variable capacitor 312 to obtain the reference frequency fr in relation to the resonance frequency of the resonator 311 (step Sc4).

The data writing unit 244 then writes the first and second control data, and the data including the function information, such as ST, OE, or STZ, into the ROM 340 of the oscillator 300 (step Sc5), and a series of processing is then completed.

After step Sc5, it is possible to check once again the control data written into the ROM 340 or to inspect the oscillator by measuring, for example, the output frequency and the power consumption of the oscillator 300 by using the data acquiring unit 245.

As described above, the control-data writing apparatus 200 is able to generate the control data according to the order data sent from the business center server 100 to the control-data writing apparatus 200, and also writes the control data into the ROM 340 of the blank oscillator 300'. Accordingly, the control-data writing apparatus 200 manufactures the oscillator 300 for oscillating at the output frequency f0 required by the user.

[1.6] Operation of Order-receiving/Manufacturing System for Oscillators

Figure 11:
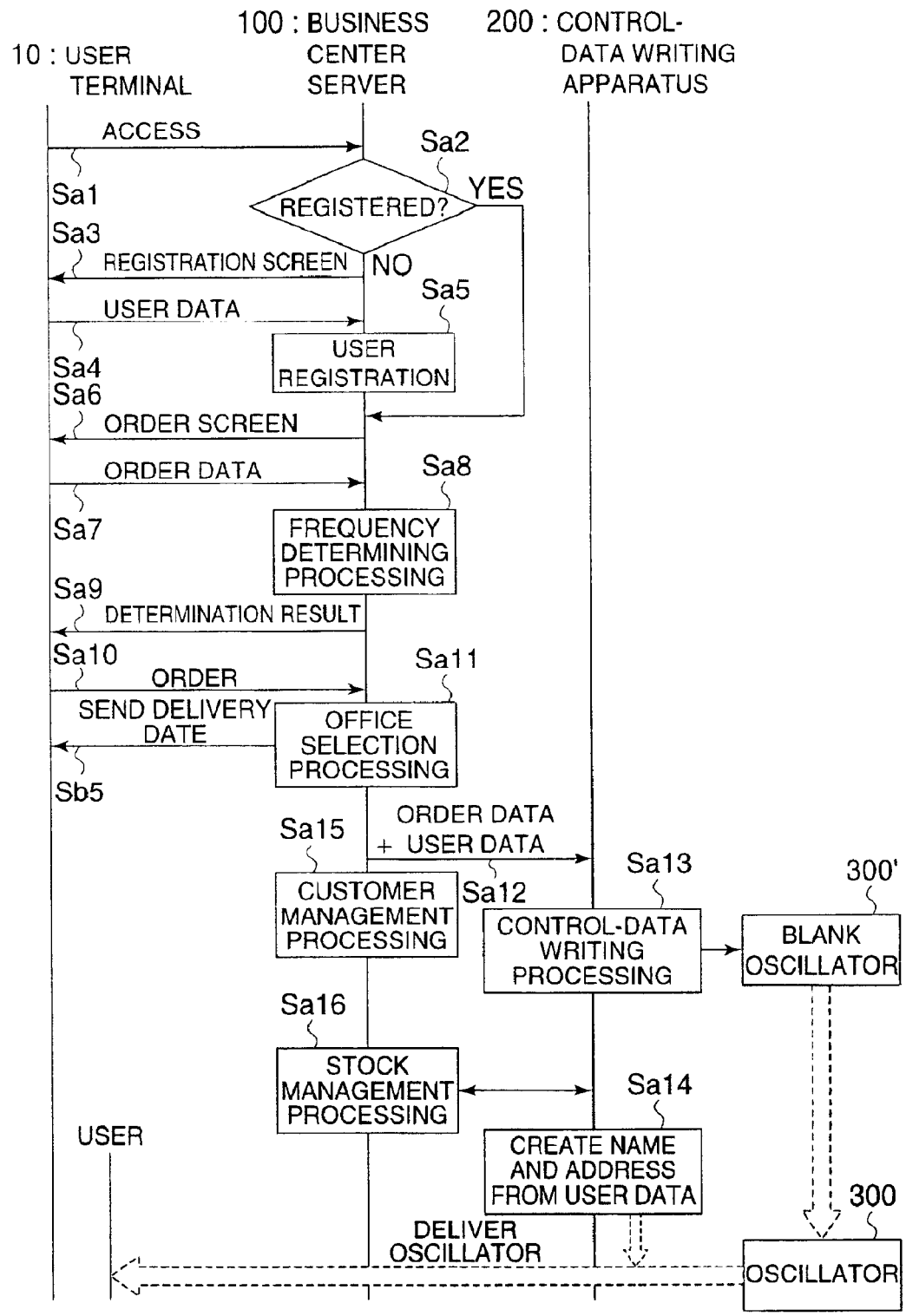
FIG. 11 is a sequence chart illustrating the process operation performed by the order-receiving/manufacturing system for oscillators according to the same embodiment.

An overview of the processing performed by the order-receiving/manufacturing system for oscillators according to this embodiment is described below with reference to the flow chart of FIG. 11.

First, the user who requires an oscillator operates the input device 14 of the user terminal 10 to access the business center server 100 via the Internet 1000 (step Sa1). In this case, the user sends the user ID (or IP address).

The business center terminal 100 checks the ID and determines whether the user has already registered (step Sa2). If the user has not yet registered (step Sa2; NO), the data of the registration screen is sent to the user terminal 10 (step Sa3).

Then, the screen, such as that shown in FIG. 12, is displayed on the monitor 15 of the user terminal 10. The user inputs user data, such as the company name and section, the user name, the telephone number, the postal code, the address, the mail address, and the purpose of use, by using the input device 14 according to the display on the screen. After the data is input, if the user selects a selection button "go" between buttons "go" and "reset" indicated on the screen, the user terminal 10 sends the user data input on the screen to the business center server 100 (step Sa4).

The postal code and the address may be for a destination of the oscillator rather than for the company or the individual.

The business center server 100 stores the received user data in the customer database of the DB 108 (step Sa5).

If the user has already registered (step Sa2; YES), the business center server 100 omits the processing of steps Sa3 through Sa5 and performs processing of step Sa6 and the subsequent steps.

Subsequently, the business center server 100 sends the data of the order screen to the user terminal 10 (step Sa6).

Figure 13:
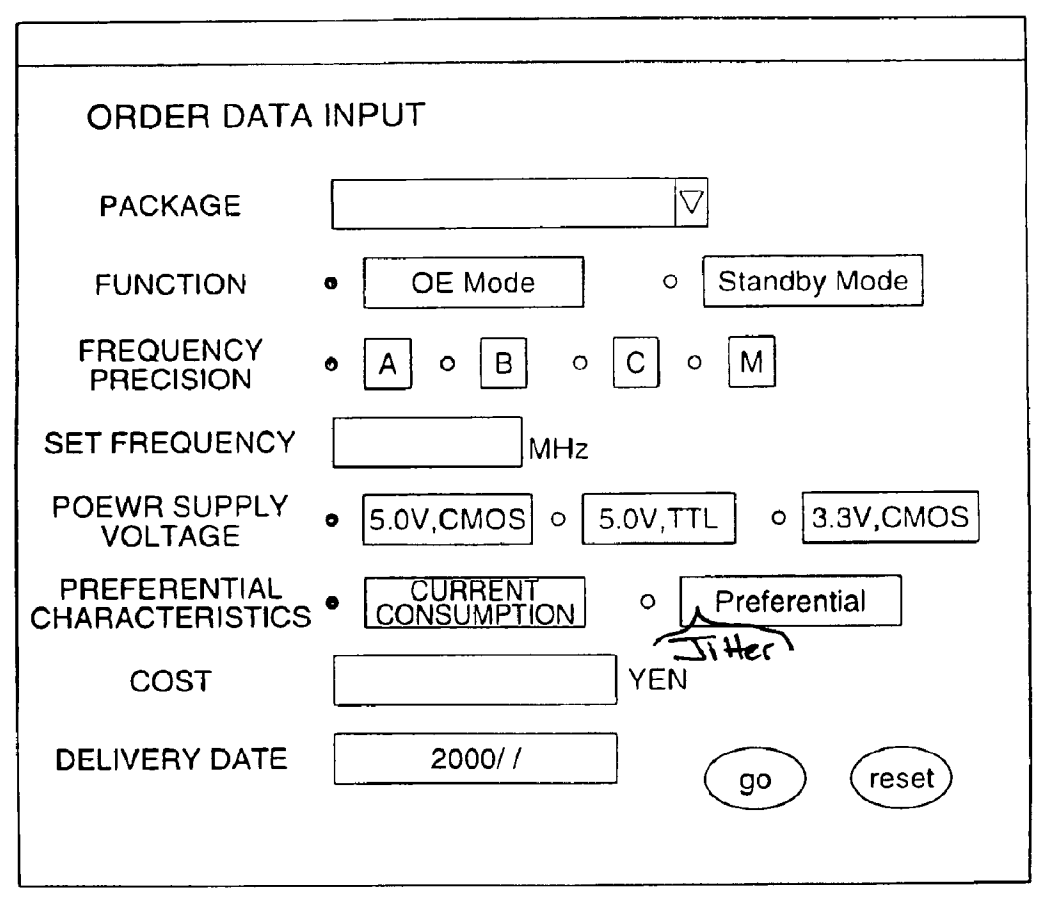

Then, the screen, such as that shown in FIG. 13, is displayed on the monitor 15 of the user terminal 10. According to the display on the screen, the user inputs order data of an oscillator by using the input device 14.

More specifically, the order data includes the selections of package, function, frequency precision, set frequency, power supply voltage, preferential characteristics, cost, delivery date, and so on. For example, when selecting the package, the user clicks ▽ (pull-down menu button) positioned at the right side of the item "package" with a mouse pointer so as to open the menu. Then, six packages are displayed, as shown in FIG. 14, and the user selects a package with a mouse pointer. In selecting the function, i.e., the OE mode or the standby mode, the frequency precision, the power supply voltage, or the preferential characteristics, one of the radio buttons positioned at the left side of each item is clicked with a mouse pointer. The other items are selected by inputting numbers through the keyboard.

After inputting the data, when the user selects the selection button "go" between buttons "go" and "reset" indicated on the screen, the user terminal 10 sends the input order data to the business center server 100 (step Sa7).

The business center server 100 extracts the frequency data from the received order data, and then performs processing for determining whether it is possible to manufacture an oscillator which generates an output signal having the extracted frequency (step Sa8). In this embodiment, this determination processing is performed based on the data prestored in the DB 108 of the business center server 100, and a detailed explanation will thus be omitted.

The business center server 100 sends the determination result of the frequency determination processing to the user terminal 10 (step Sa9). "OK" or "NG" is displayed on the monitor 15 of the user terminal 10. By observing this result, the user reconsiders whether to order the oscillator. If the user has decided to order the oscillator, a signal indicating an order for the oscillator is sent from the user terminal 10 to the business center server 100 (step Sa10).

Upon receiving the order signal, the business center server 100 performs the office selection processing (step Sa11).

Figure 15:
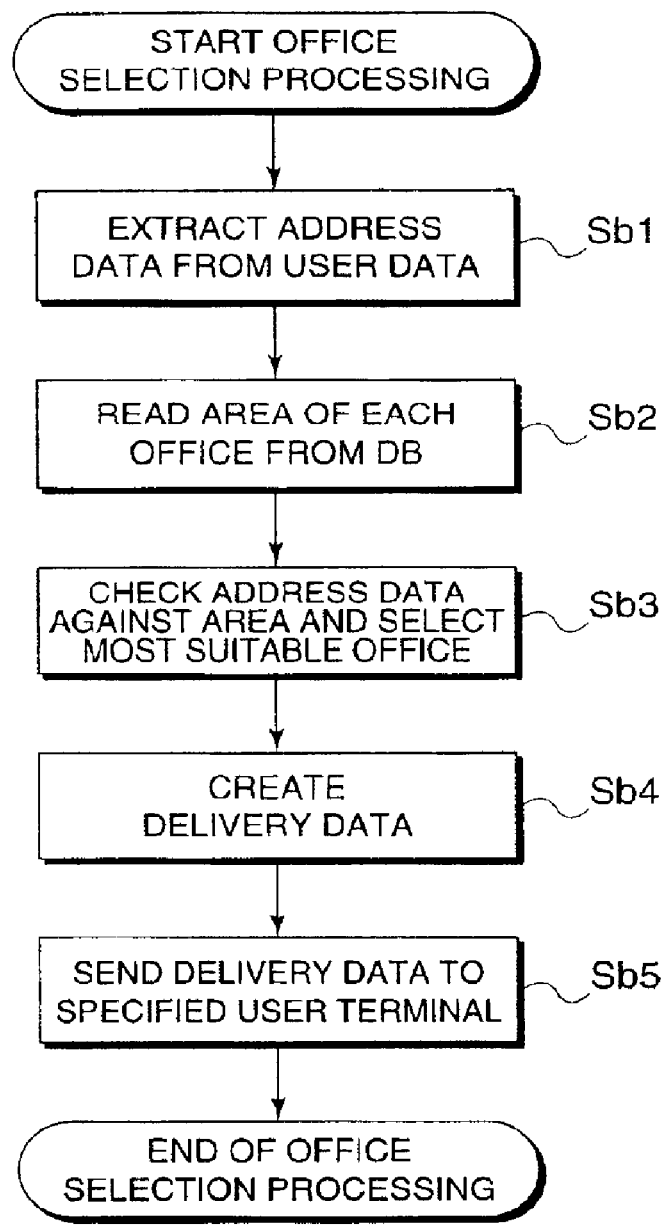
FIG. 15 is a flow chart illustrating the office selection processing performed by the business center server.

The office selection processing is discussed below with reference to the flow chart of FIG. 15.

The CPU 101 of the business center server 100 extracts the address data from the user data previously stored in the DB 108 (step Sb1).

Then, the CPU 101 reads the prestored business management data 110 from the DB 108 (step Sb2), and checks the address data against the management area, thereby selecting the most suitable office (step Sb3).

Subsequently, the CPU 101 creates delivery data by calculating the time required for delivering the oscillator according to the distance from the selected office to the address specified by the user (step Sb4). The delivery data may be determined based on the information concerning the delivery date in the selected office, such as the stock and the delivery cost of the oscillator.

The CPU 101 then sends the delivery data to the user terminal 10 (step Sb5).

As discussed above, in the office selection processing, the most suitable office for the user is selected, and also, the delivery data is informed to the user.

The office selection processing may be performed simultaneously with the frequency determining processing, and delivery data may be sent together with the determination result to the user terminal. With this arrangement, the number of factors for determining whether the user orders the oscillator can be increased. In this case, step Sa10 is a provisional order step, and the user issues an official order after checking the delivery data (step Sb5) sent to the user.

Returning to FIG. 11, the business center server 100 sends the order data and the user data to the control-data writing apparatus 200 of the selected office via a LAN (step Sa12).

The control-data writing apparatus 200 receives the order data and the user data via the modem 226, and stores them in the RAM 223.

Upon receiving the order data and the user data, the control-data writing apparatus 200 performs the above-described control data writing processing (step Sa13). Accordingly, the control data is written into the ROM 340 of the blank oscillator 300', thereby manufacturing the oscillator 300 in accordance with the specifications requested by the user.

Subsequently, the control-data writing apparatus 200 reads the postal code data and the address data from the user data stored in the ROM 223 of the control-data writing apparatus 200, and prints the postal code and the address on a delivery sheet by using the printer 228 (step Sa14). The delivery sheet is then attached to the box containing the oscillator 300, and the oscillator 300 is delivered to the user. In this case, a bill on which the charge for the oscillator 300 is printed may be simultaneously issued.

The business center server 100 also performs the customer management processing (Sa15). In this customer management processing, the user data and the order data sent from the user terminal 10 are sequentially stored in the DB 108, and manage the number of the manufactured oscillators 300, the frequency, the user information, etc. according to the stored data.

The business center server 100 also performs the stock management processing (step Sa16). In this stock management processing, the number of each type of blank oscillators 300' prepared for each office is managed according to the stock management data (see FIG. 5) stored in the DB 108. With this processing, for example, the blank oscillators 300' are delivered from a manufacturer (not shown) so that 100 blank oscillators 300' are provided for each office, thereby ensuring that a predetermined number of oscillators 300' can be constantly stored.

[1.7] Advantages of First Embodiment

As is seen from the foregoing description, according to the order-receiving/manufacturing system for oscillators of this embodiment, the oscillator required by the user is manufactured based on the order data sent from the user terminal 10. The oscillator used in this system can be manufactured by writing the control data into the blank oscillator 300' prepared in the office nearest to the destination designated by the user. As a result, the time from when the business center server 100 receives the order data from the user terminal 10 to when the oscillator 300 is manufactured can be reduced, thereby significantly shortening the period from the order date to the delivery date.

Additionally, the control-data writing apparatus 200 installed in each office automatically writes the control data into the ROM 340 of the blank oscillator 300' based on the order data sent from the business center server 100. Thus, manual processing is unnecessary during the period from the order-receiving step to the oscillator-manufacturing step, thereby eliminating human operational errors and increasing the reliability.

[2] Second Embodiment

An order-receiving/manufacturing system for oscillators according to this embodiment is characterized in that characters, graphics, or patterns specified by a user are printed on a package of the oscillator. The same elements as those described in the first embodiment are designated with like reference numerals, and an explanation thereof will thus be omitted.

[2.1] Schematic Configuration of Second Embodiment

Figure 16:
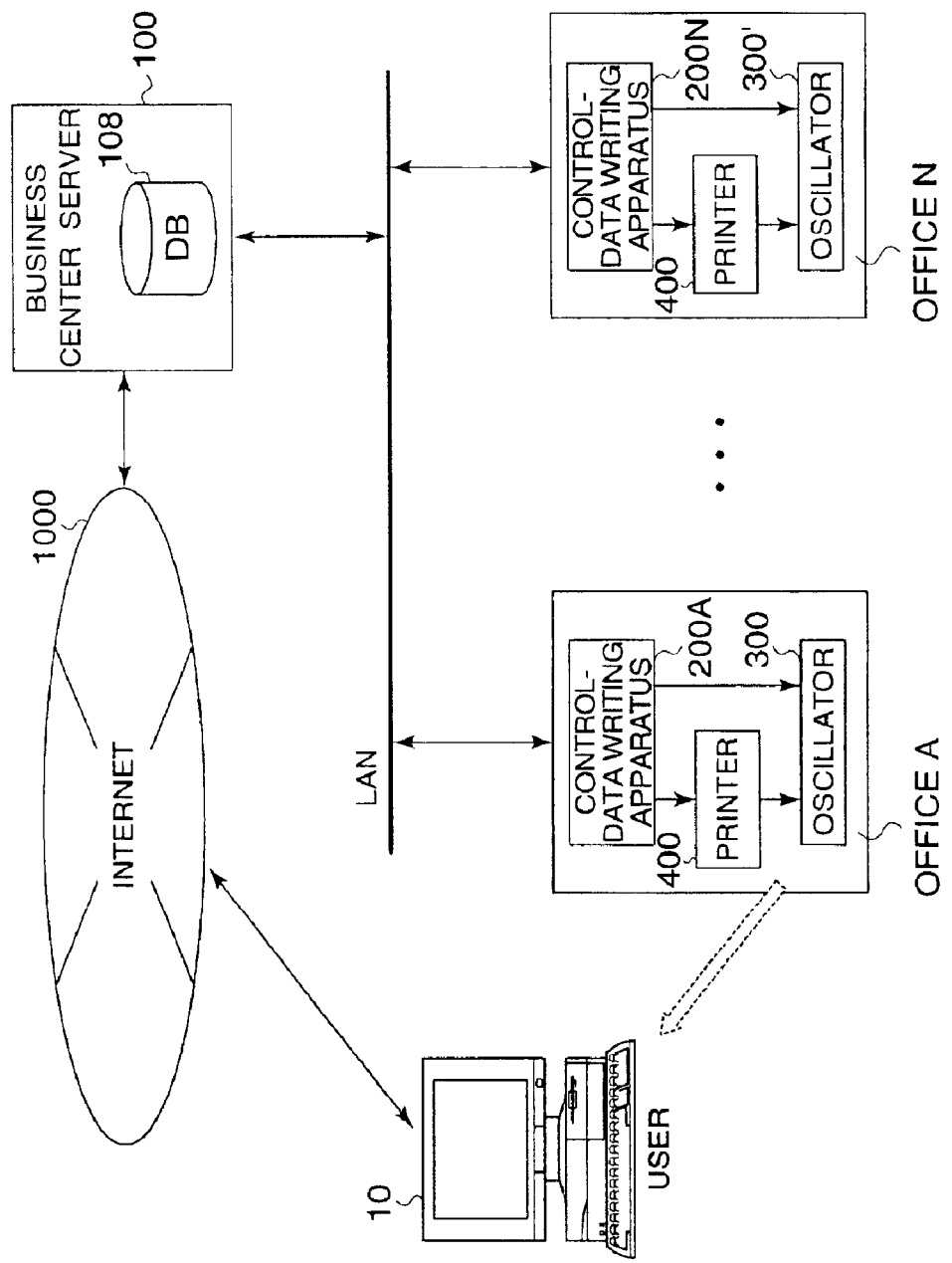
FIG. 16 is a schematic diagram illustrating an order-receiving/manufacturing system for oscillators according to a second embodiment.

FIG. 16 is a schematic diagram illustrating an order-receiving/manufacturing system for oscillators according to the second embodiment.

This order-receiving/manufacturing system is largely formed of a business center server 100 connected to the Internet 1000, control-data writing apparatuses 200A, 200B, ..., 200N (generally, referred to as a control-data writing apparatus 200) connected to this business center server 100 via a LAN (Local Area Network) or a WAN (Wide Area Network), and a printer 400 connected to the control-data writing apparatus 200.

The printer 400 receives character data contained in the order data, and prints characters corresponding to the character data on the package of the oscillator 300.

[2.2] Operation of Second Embodiment

Figure 17:
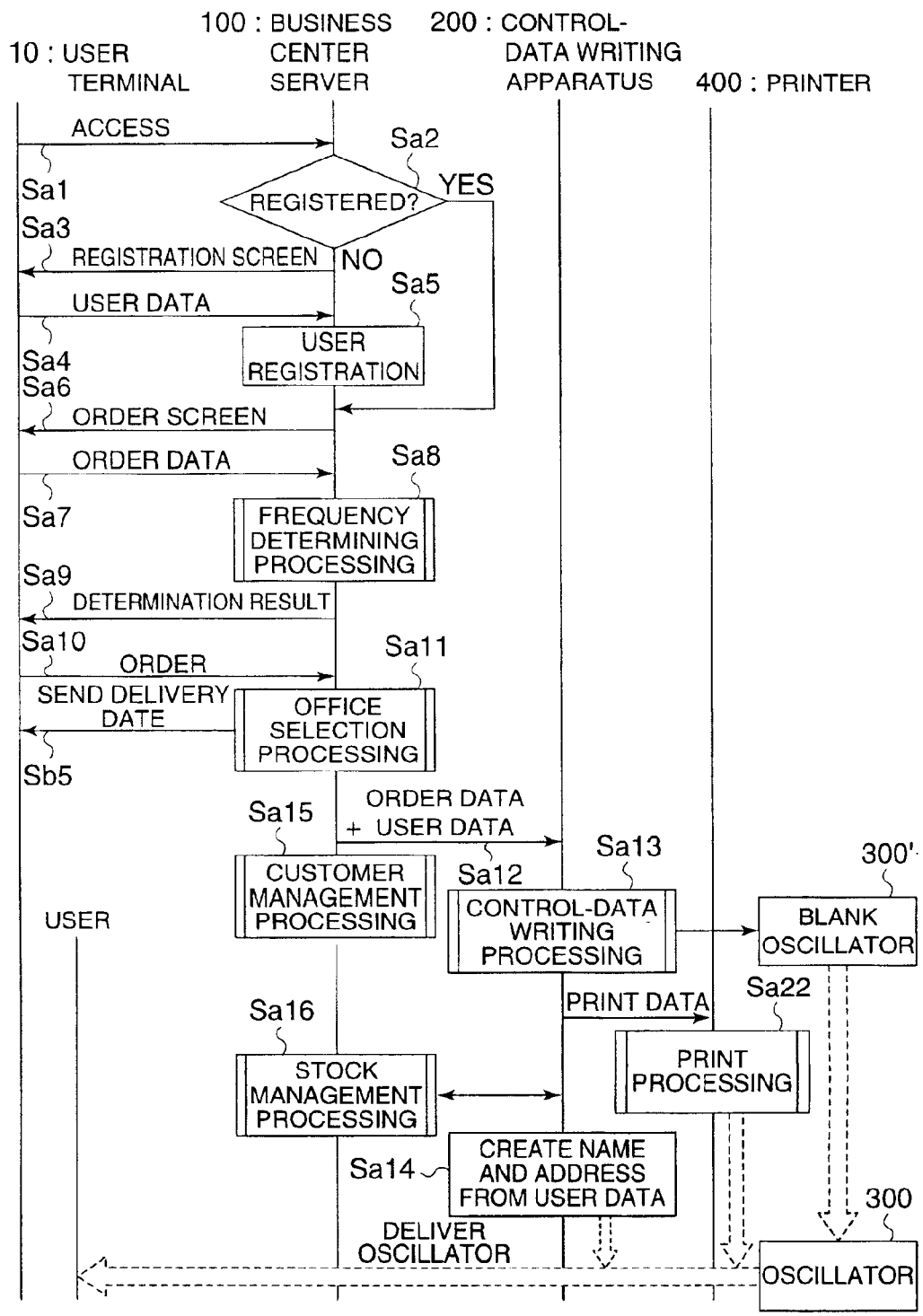
FIG. 17 is a sequence chart illustrating the process operation performed by the order-receiving/manufacturing system for oscillators according to the same embodiment.

A description is given below, with reference to FIG. 17, of an overview of the processing performed by the order-receiving/manufacturing system for oscillators according to this embodiment.

An explanation of the processing similar to that of the first embodiment will also be omitted.

In this embodiment, in order to print characters on the package of the oscillator 300 by using the printer 400, the user is required to input print data corresponding to the characters on the order screen.

The input screen for the order data is as shown in FIG. 18.

A column for inputting characters which the user requires to print is provided at the bottom portion of the order-data input screen. The user operates the input device 14 to input the characters into this column. For example, the user name, the frequency, and so on, may be input.

The user terminal 10 then sends the order data including this print data to the business center server 100 via the Internet 1000 (step Sa7).

Thereafter, by performing processing similar to that of the first embodiment, the control-data writing apparatus 200 writes the control data into the blank oscillator 300'. The control-data writing apparatus 200 then extracts the print data from the order data, and sends the print data to the printer 400 (step Sa21).

The printer 400 receives this print data, and performs processing for printing the characters corresponding to the print data on the package of the oscillator 300 (step Sa22).

As discussed above, according to the order-receiving/manufacturing system for oscillators of this embodiment, the characters specified by the user can be printed on the package of the oscillator 300, thereby making it possible to manufacture the oscillator with a unique external appearance.

In this embodiment, characters are printed on the package of the oscillator 300. However, the present invention is not restricted to this arrangement, and characters, graphics, or patterns may be marked by using a laser or a carving tool.

Additionally, characters, graphics, or patterns may not be directly printed on the package. Alternatively, a sheet having printed characters, graphics, or patterns, may be attached to the package. In short, any means which can be marked on the package of the oscillator 300 may be used.

[3] Example of Modification

The embodiments according to the present invention have been described. However, they are examples only, and may be modified within the spirit and scope of the present invention. Examples of modifications follow.

[3.1] Modified Example 1

In the foregoing embodiments orders of oscillators are received and the oscillators are manufactured in Japan. However, the present invention is not limited to domestic use, and may be extended worldwide.

Figure 19:
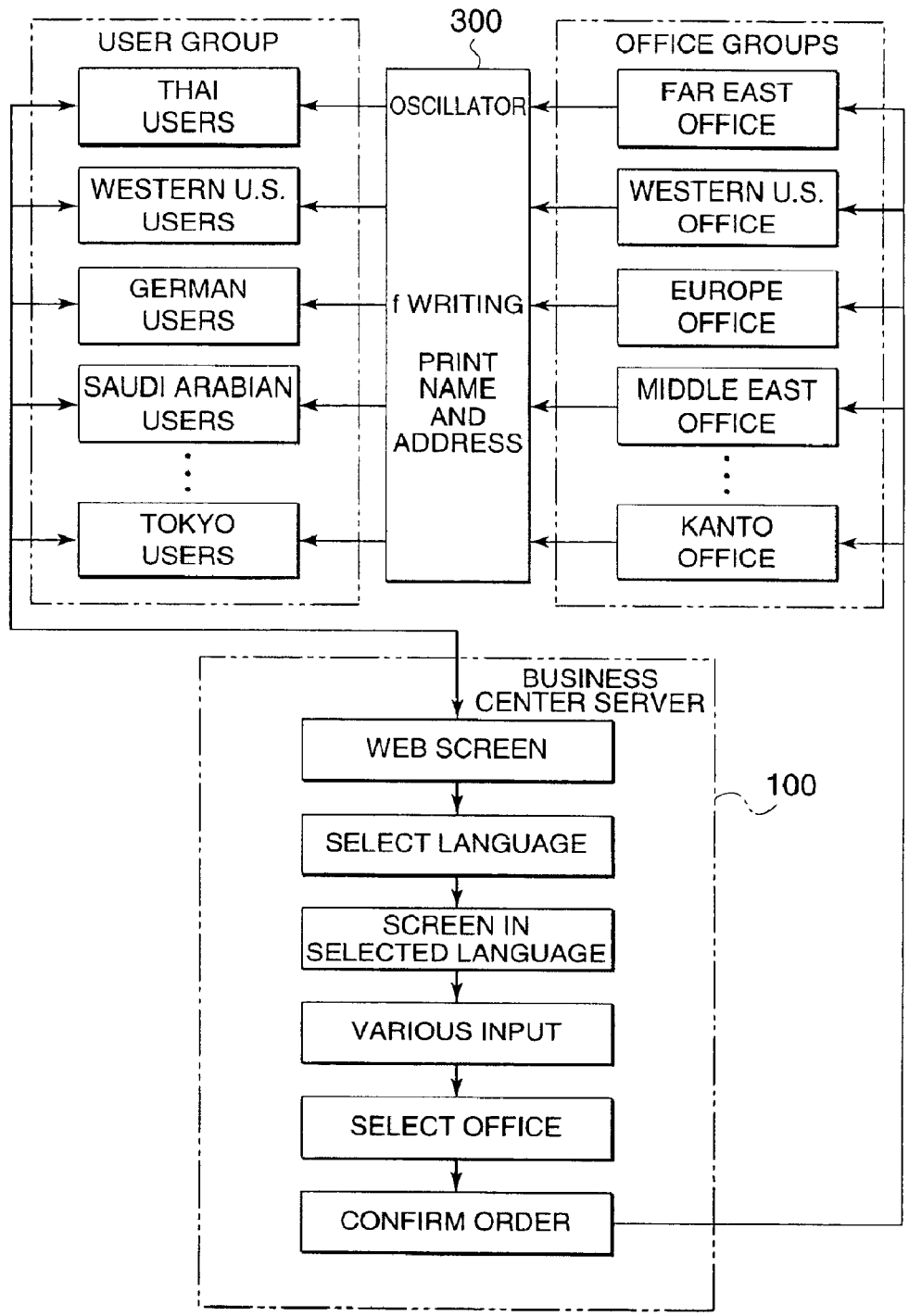
FIG. 19 is a schematic diagram illustrating an order-receiving/manufacturing system for oscillators according to an example of modifications.

FIG. 19 is a schematic diagram illustrating a system in which orders of oscillators are received and the oscillators are manufactured worldwide.

The business center server 100 displays a web screen, instructs a user to select the language, displays the screen in the selected language, performs various inputting operations, selects the office, and checks the order among user groups.

The business center server 100 is provided with a converting function of converting the language into the language used by the user.

An office group specifically includes the Far East office, the Western U.S. Office, the Europe Office, the Middle East Office, ..., and the Kanto Office. A user group specifically includes Thai users, Western U.S. users, German users, Saudi Arabian users, ..., and Tokyo users.

The business center server 100 stores the areas managed by the individual offices of the office group as the office management data, and selects the office corresponding to the user based on this data.

As discussed above, the oscillators 300 are prepared in the foreign offices authorized by the business center. It is thus possible to significantly shorten the period from the order date to the delivery date of oscillators.

[3.2] Modified Example 2

Although in the foregoing embodiments the number of oscillators 300 is not specified, it may be indicated in the order data and the indicated number of oscillators may be manufactured.

For example, it is now assumed that a user orders ten oscillators of the package JA, and the office A is selected as the most suitable office. However, there is a shortage of blank oscillators 300' of the package JA in the office A, in which case, the business center server 100 may request another office to manufacture and deliver oscillators.

Reference is not particularly made to settlement. However, a key may be sent when performing the user registration, and the user may send a credit card number by using this key from the user terminal 10 to the business center server 100, and money may be deducted by using the credit card. Alternatively, money may be transferred after delivery.

[3.3] Modified Example 3

In the above-described embodiments, the blank oscillator 300' is formed as a programmable oscillator having the PLL circuit 324. However, the present invention is not limited to this type, and the blank oscillator 300' may be formed as another type of circuit. Any type of oscillator may be used as long as it can change the specifications of the oscillating operation by storing control data.

As is seen from the foregoing description, in the order-receiving/manufacturing system for oscillators according to the present invention, the period from when the order for an oscillator is received to when the oscillator is manufactured can be shortened.

The entire disclosure of Japanese Patent Application No. 2000-309643 filed Oct. 10, 2000 is incorporated herein by reference.

What is claimed is:

1. An order-receiving/manufacturing system for receiving an order for an oscillator having a frequency control unit and manufacturing the oscillator according to a specification required by a user, comprising:

a business center server adapted to receive, via a network from a user terminal, order data including a desired oscillation frequency and user data including a destination of said oscillator for the user, and adapted to select, among control-data writing apparatuses installed in a plurality of places, the control-data writing apparatus which comprises a power system, a data control system, and a frequency measuring system, is configured to be installed in the place most suitable for receiving the order for said oscillator based on the order data or the user data, and adapted to said order data and said user data to the selected control-data writing apparatus; and said control-data writing apparatus adapted to generate control data from the received order data for an oscillator which oscillates in accordance with the control data written into said oscillator, and adapted to write said control data into the frequency control unit of said oscillator, and wherein order data is sent to the control-data writing apparatus directly through the network from the business center server.

2. An order-receiving/manufacturing system according to claim 1, wherein:

said order data comprises marking data indicating at least one of characters, graphics, or patterns to be marked on a surface of said oscillator; and the characters, the graphics, or the patterns are marked on the surface of said oscillator based on said marking data by a marking device disposed adjacent to said control-data writing apparatus.

3. An order-receiving/manufacturing system according to claim 2, wherein:

said marking data comprises print data; and said marking device comprises a printer.

4. An order-receiving/manufacturing system according to claim 2, wherein:

said marking data comprises carving data; and said marking device comprises a carving device.

5. An order-receiving/manufacturing system according to claim 1, wherein said business center server informs a delivery date of said oscillator to a user terminal based on delivery information of the selected control-data writing apparatus.

6. An order-receiving/manufacturing system according to claim 5, wherein the delivery information comprises a distance between the selected control-data writing apparatus and a destination of said oscillator, the number of oscillators prepared for said control-data writing apparatus, or delivery cost.

7. An order-receiving/manufacturing system according to claim 1, wherein said business center server determines based on the order data including the oscillation frequency whether it is possible to manufacture the oscillator which generates the oscillation frequency required by the user.

8. An order-receiving/manufacturing system according to claim 1, wherein said business center server comprises storage means for storing the number of oscillators into which the control data is to be written, and which are prepared for each of said control-data writing apparatuses, and said business center server performs stock management for said oscillators.

9. An order-receiving/manufacturing system according to claim 1, wherein said business center server comprises storage means for sequentially storing and updating said order data and said user data, and performs customer management.

10. An order-receiving/manufacturing system according to claim 1, wherein said order data comprises data including the configuration or the material of said oscillator.

11. An order-receiving/manufacturing system according to claim 1, wherein said order data comprises data including a function of indicating a waveform status when said oscillator is activated to output the oscillation frequency.

12. An order-receiving/manufacturing system according to claim 1, wherein said order data comprises data including a power supply voltage.

13. An order-receiving/manufacturing system according to claim 1, wherein said order data comprises data including temperature frequency stability.

14. An order-receiving/manufacturing system according to claim 1, wherein said order data comprises data including the number of oscillators to be ordered.

15. A control method for an order-receiving/manufacturing system for receiving an order for an oscillator having a frequency control unit and manufacturing the oscillator according to a specification required by a user, said control method comprising:

a step of receiving, via a network from a user terminal, order data including a desired oscillation frequency and user data including a destination of said oscillator for the user;

a step of selecting, among control-data writing apparatuses installed in a plurality of places, the control-data writing apparatus which comprises a power system, a data control system, and a frequency measuring system, is configured to be installed in the place most suitable for receiving the order for said oscillator based on said order data or said user data;

a step of sending said order data and said user data to the selected control-data writing apparatus; and a step of generating control data from the received order data for an oscillator which oscillates in accordance with said control data written into said oscillator, and of writing said control data into the frequency control unit of said oscillator by said control-data writing apparatus.

16. A control method for an order-receiving/manufacturing system according to claim 15, wherein said order data comprises marking data indicating at least one of characters, graphics, or patterns to be marked on a surface of said oscillator, and said control method comprising the step of marking the characters, the graphics, or the patterns on the surface of said oscillator based on said marking data by using a marking device disposed adjacent to said control-data writing apparatus.

17. A business center server for receiving, via a network from a user terminal, order data including a desired oscillation frequency and user data including a destination of an oscillator, said business center server comprising:

office-management-data storage means for storing as office management data a management area assigned to each of a plurality of offices provided with a data-control writing apparatus for generating control data from the received order data for an oscillator having a frequency control unit which controls the oscillation of the oscillator in accordance with said control data written into said oscillator, and for writing said control data into said oscillator by said control-data writing apparatus, said data control apparatus comprises a power system, a data control system, and a frequency measuring system;

office selecting means for selecting an office most suitable for receiving an order from the user terminal for said oscillator based on said user data and said office management data from a plurality of offices; and data sending means for sending said order data and said user data to the selected office.

18. A business center server according to claim 17, wherein a delivery date of said oscillator is informed to a user terminal based on delivery information of the selected office.

19. A business center server according to claim 17, wherein the delivery information comprises a distance between the selected office and a destination of said oscillator, the number of oscillators prepared for said control-data writing apparatus, or delivery cost.

20. A business center server according to claim 17, wherein it is determined based on said order data including said oscillation frequency whether it is possible to manufacture an oscillator which generates the oscillation frequency required by the user.

21. A business center server according to claim 17, comprising storage means for storing the number of oscillators into which said control data is to be written and which are prepared for each of the offices, thereby performing stock management for said oscillators.

22. A business center server according to claim 17, comprising storage means for sequentially storing and updating said order data and said user data, thereby performing customer management.

23. A control-data writing apparatus installed in each office and provided with a function of receiving order data via a network from a user terminal, for generating control data at least from said order data for an oscillator which oscillates in accordance with said control data written into said oscillator, and for writing said control data into said oscillator, said control-data writing apparatus being used for an oscillator which comprises:

variable capacitor means for outputting a reference signal of a reference oscillation frequency obtained by adjusting a resonance frequency of a piezoelectric resonator;

frequency control means for acquiring an output signal of an output frequency by dividing and/or multiplying the frequency of said reference signal; and a memory for storing control data of said variable capacitor means and said frequency control means, said control-data writing apparatus including:

an oscillator connecting unit for connecting a terminal of said oscillator;

a characteristic-data generator for generating characteristic data including at least a desired oscillation frequency, which is a target frequency of said oscillator, from the received order data;

first control data generator for generating first control data in response to the order data from the user terminal for controlling said frequency control means to acquire the target oscillation frequency in relation to the reference oscillation frequency;

second control data generator for generating second control data for controlling said variable capacitor means to acquire the reference oscillation frequency in relation to the resonance frequency of said piezoelectric resonator; and a data writing controller for writing said first control data and said second control data into said memory.

* * * * *